United States Patent [19]

Taylor et al.

[11] 3,926,670

[45] Dec. 16, 1975

[54] LEAD-ACID STORAGE BATTERY PASTE

[75] Inventors: Dale F. Taylor, Schenectady; Erwin G. Siwek, Ballston Spa, both of N.Y.

[73] Assignee: General Electric Company, Schenectady, N.Y.

[22] Filed: Oct. 23, 1973

[21] Appl. No.: 408,298

[52] U.S. Cl. ................................................ 136/26
[51] Int. Cl.² ......................................... H01M 4/36
[58] Field of Search ......... 136/26, 27; 106/297, 306

[56] References Cited
UNITED STATES PATENTS

| | | | |
|---|---|---|---|
| 1,374,076 | 4/1921 | Grimditch | 136/26 |
| 2,866,840 | 12/1958 | Dittman et al. | 136/26 |
| 3,523,041 | 8/1970 | Limbert et al. | 136/26 |
| 3,607,408 | 9/1971 | Duddy | 136/26 |

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A lead-acid battery paste is described which consists of at least one battery lead oxide, lithium sulfate, and water.

6 Claims, No Drawings

LEAD-ACID STORAGE BATTERY PASTE

The present invention relates generally to a lead-acid storage battery paste, and more particularly to a water base paste employing at least one battery lead oxide and lithium sulfate.

Lead-acid storage battery paste is useful to prepare positive and negative plates for lead-acid storage batteries. Pasted plates for such batteries are discussed in detail, for example, on pages 10–40 of "Storage Batteries" by George W. Vinal published by J. Wiley & Sons, Inc., New York, N.Y., 1940. It is pointed out in the above referenced volume that pastes are also made by mixing an oxide with solutions of magnesium or ammonium sulfate but that these materials are not suitable for use in a storage battery. Further, it is pointed out above that in addition to preparing the paste with solutions of these sulfates, the manufacturers sometimes mix them with the oxides in the dry form and then the paste is generally prepared with sulphuric acid.

As mentioned in the above-identified referenced volume, pastes have also been made by mixing a battery oxide with solutions of magnesium or ammonium sulfate. It is then pointed out above that these materials are not useful for a storage battery. A number of patents issued prior to the 1940 publication date of the above volume concerning the addition of certain sulfates. For example, in U.S. Pat. No. 917,787 a paste mixture is described wherein the lead oxide is mixed with distilled water, ammonium sulfate, acetone and acetic acid. In U.S. Pat. No. 535,541 a paste is made by mixing lead oxide and magnesium sulfate together which mass is then made into a paste by moistening with ammonium sulfate. U.S. Pat. No. 1,306,214 describes making thin plates for batteries by providing a paste of lead oxide and aluminum sulfate in sulfuric acid and water. U.S. Pat. No. 1,374,076 describes a process of making storage battery plates wherein the paste mixture of lead with ammonium sulfate, sulfuric acid or other solution is prepared and a consistency of the paste is adjusted by temperature regulation. In U.S. Pat. No. 1,251,412 a paste is made of lead oxide and lead sulfate with sulfuric acid. The cell is then filled with an improved electrolyte.

The next four patents are directed to providing sulfates which are subsequently removed from the battery plate to provide porosity therein. U.S. Pat. No. 660,228 describes a paste of lead oxide and potassium or ammonium sulfate or phosphate in liquid ammonia. In British Pat. No. 184,649 a paste is made of lead and aluminum sulfate to provide for porosity. In U.S. Pat. No. 1,536,064 an initial dry mixture of lead oxide and a soluble porosity salt which is later removed to provide pores is provided. The porosity salt may be sodium sulfate, sodium acid sulfate, potassium sulfate, potassium acid sulfate or ammonium sulfate. U.S. Pat. No. 1,467,749 describes a dry mixture of lead oxide and sodium or potassium acid sulfate. Subsequently, the sodium or potassium is leached out.

Subsequent to the above 1940 reference volume U.S. Pat. No. 2,938,063 describes a paste of lead oxide and a metallic sulfate selected from the group consisting of aluminum sulfate, magnesium sulfate and mixtures thereof which is mixed with a sulfate or sulfuric acid, lead sulfate or basic lead sulfate. This composition is initially mixed with water and is employed to provide more porous plates. U.S. Pat. No. 3,702,265 describes a lead oxide storage battery paste having a water base which employs two bulkers. The first bulker is carboxymethyl cellulose or a sulfate and a second bulker made of specific hollow siliceous material for porosity.

None of the above patents nor the above referenced volume describes, suggests or teaches a lead storage battery paste employing lithium sulfate. None of the above references teach the employment of a water base paste employing battery lead oxide and lithium sulfate as in applicants' present invention.

None of the above patents nor the above referenced volume disclose, suggest or teach the use of lithium sulfate in any type of battery paste or the desirability of such use. The only reference to a lithium addition in a lead-acid battery, of which we are aware, is an article entitled "Laboratory Evaluation of Non-Antimonial Lead Alloys for Lead-Acid Batteries" by D. L. Douglas and G. W. Mao in the "Proceedings of the Eighth International Power Sources Symposium," pages 379–398, 1972. In this article, an alloy of 0.015 lithium and the remainder of lead was one of several lead alloys prepared and evaluated. These alloys were anodically corroded and were also used as grids in a battery. A conventional mixture of lead oxide and sulfuric acid was used to paste these plates. It is pointed out on page 397, that it was further found that the use of a non-antimonial type alloy such as lithium, but not calcium, can give rise to certain beneficial effects similar to antimony. It is pointed out further that it seems necessary that the paste be saturated with a particular solute such as lithium in order to realize any beneficial effect. This article does not suggest, disclose or teach the present invention of a water base paste employing at least one battery lead oxide and lithium sulfate resulting in the unexpected, distinct advantage of long lead-acid battery cycle life.

The primary objects of our invention are to provide an improved lead-acid storage battery paste of good consistency and good spreadability which results in long cycle life.

In accordance with one aspect of our invention, a cohesive lead oxide paste consists of at least one battery lead oxide, lithium sulfate and water.

These and various other objects, features and advantages of the invention will be better understood from the following description:

We found unexpectedly that the use of lithium sulfate rather than sulfuric acid in the paste for the preparation of both positive and negative electrode plates for lead-acid batteries resulted in increased ease of handling, ease of paste mixing, and plate integrity. Additionally, the positive plate provides improved electrochemical performance on deep cycle duty. We found that lithium sulfate could be mixed dry with both leady and non-leady battery oxides and then mixed with water as opposed to mixing such lead oxides with water and sulfuric acid which is often employed. An acceptable quantity of lithium sulfate in the paste was equivalent in sulfate/oxide ratio to the ratio used in conventional paste formulation. We used water in an amount to produce a paste of good consistency.

We discovered unexpectedly that our paste does not set up or harden as rapidly as a conventional paste, and spreads more smoothly. Unexpectedly, we found that lead-acid battery plates made with our paste are initially lower in active material utilization, but which gradually build in capacity and outlast conventionally made plates pasted on non-antimonial lead-alloy grid on deep discharge cycle service by a factor of two or more. We found that our paste made with non-leady oxide appears to be slightly superior to those in which a leady oxide, 20 to 30% metallic lead and 70 to 80% lead oxide, is used.

We found that we could form a novel lead oxide mixture which is adapted to form a cohesive paste for use in the preparation of lead-acid storage batteries. Such a mixture is made by mixing together in dry state at least one battery lead oxide and lithium sulfate. Types of battery lead oxides employed in mixtures for paste making and the making of pastes from lead oxide mixtures are described in the above referenced volume. We found that the preferred mixture contained lithium sulfate monohydrate in an amount of 36.6 grams per pound of the battery lead oxide.

We found that we could form a novel cohesive lead oxide paste for use in the preparation of lead-acid storage batteries by employing the above-described lead oxide mixture and making a paste therefrom by the addition of only water. Alternately, the lithium sulfate could be dissolved in water and the resulting solution mixed with the battery lead oxide. It will be appreciated that one might add a small amount of dilute sulfuric acid to the water base solution, for example, to obtain a neutral rather than a basic paste. We used 50 to 70 cc of water per pound of lead oxide mixture. The resulting paste was easy to handle in pasting the non-antimonial lead grids. Both positive and negative plates were then formed as is conventional in the art and described also in the above referenced volume. It will be appreciated that an expander is added to the lead oxide mixture during preparation of the paste for a negative electrode.

Examples of battery lead oxide mixtures and battery lead oxide pastes made in accordance with our invention are set forth below:

EXAMPLE I

A battery lead oxide mixture was prepared in which one pound of battery lead oxide and 36.6 grams of lithium sulfate monohydrate, $Li_2SO_4 \cdot H_2O$, were mixed together by dry blending for a period of 60 minutes. The resulting battery lead oxide mixture which was made in accordance with our invention is adapted to form a cohesive paste for use in the preparation of lead-acid storage batteries.

EXAMPLE II

A battery lead oxide mixture was prepared for subsequent use as a paste for a negative plate. The same ingredients, amounts and procedures of Example I were employed. However, 5 grams of a conventional expander was mixed with the other ingredients to form a battery lead oxide mixture.

EXAMPLE III

A cohesive battery lead oxide paste was prepared which employed the battery lead oxide mixture of Example I. 40 grams of the mixture from Example I was mixed with 4.5 cubic centimeters of water and stirred for 5 minutes to provide a cohesive paste for use in the preparation of lead-acid storage batteries.

EXAMPLE IV

A cohesive battery lead oxide paste was prepared as in Example III. However, the battery lead oxide mixture of Example II was used.

EXAMPLES V AND VI

Two positive lead-acid battery plates were made from the lead oxide paste of Example III. The finished plates are identified as plates 1 and 2. Each of the plate grids was a calcium-tin-lead alloy. After the paste was applied to the grids, the resulting positive plates 1 and 2 were cured and formed in a conventional manner as set forth in the above referenced volume.

EXAMPLES VII AND VIII

Two positive lead-acid battery plates were formed from a conventional paste consisting of battery lead oxide, water and sulphuric acid. The finished plates are identified as plates 3 and 4. Each of the plates 3 and 4 had a calcium-tin-lead alloy grid, and was cured and formed in a conventional manner.

EXAMPLES IX–XII

Each of the above plates or electrodes 1–4, which were Examples V–VIII, respectively, was cycled in identical fashion by employing identical charging time, charging current and discharge current. Table I sets forth the results of this cycling which is expressed as discharge capacity in ampere hours per gram of paste after cycle numbers 1, 9 and 60.

TABLE I

| Positive Electrode No. | Discharge Capacity in Ampere Hours Per Gram of Paste After Cycle No. | | |
|---|---|---|---|
| | 1 | 9 | 60 |
| 1 | .0710 | .1005 | .0610 |
| 2 | .0710 | .1005 | .0610 |
| 3 | .0940 | .1000 | .0469 |
| 4 | .0940 | .1000 | .0469 |

The above data shows that electrodes 1 and 2, while poorer in initial performance, improve in capacity after repeated cycling. Electrodes similar to electrodes 1 and 2 have been successfully cycled in excess of 120 cycles. The deep discharges used in these Examples IX–XII were more severe than conventional usage would prescribe in that they were completely discharged during each cycle and recharged at constant current with considerable overcharge.

EXAMPLES XIII–XIV

In these examples, positive electrode 5, Example XIII, was prepared and cycled as described above in Examples I, III, V, VI, IX and X. Positive electrode 6, Example XIV, was made in similar manner to electrode 5 except that sodium sulfate as opposed to lithium sulfate was used. When plates 5 and 6 was cycled in identical manner, electrode 5 made with lithium sulfate had twice the cycle life as electrode 6 containing sodium sulfate.

While other modifications of the invention and variations thereof which may be employed within the scope of the invention have not been described, the invention is intended to include such as may be embraced within the following claims.

What we claim as new and desire to secure by Letters Patent of the United States is:

1. A battery lead oxide mixture adapted to form a cohesive paste for use in the preparation of lead-acid storage batteries comprising at least one battery lead oxide and lithium sulfate.

2. A battery lead oxide mixture as in claim 1, in which a negative expander is added to the mixture.

3. A battery lead oxide mixture as in claim 1, in which lithium sulfate monohydrate is present in an amount of 36.6 grams per pound of the battery lead oxide.

4. A cohesive battery lead oxide paste comprises at least one battery lead oxide, lithium sulfate, and water.

5. A cohesive battery lead oxide paste as in claim 4, in which there is a negative expander.

6. A cohesive battery lead oxide paste as in claim 4, in which lithium sulfate monohydrate is present in an amount of 36.6 grams per pound of the battery lead oxide.

* * * * *